(12) United States Patent
Mika

(10) Patent No.: US 7,433,878 B2
(45) Date of Patent: Oct. 7, 2008

(54) METHOD AND SYSTEM FOR INTERFACING WITH ACCOUNTING SYSTEMS

(75) Inventor: Lawrence J. Mika, Wood Dale, IL (US)

(73) Assignee: American Express Travel Related Services Company, Inc., New York, NY (US)

( * ) Notice: Subject to any disclaimer, the term of this patent is extended or adjusted under 35 U.S.C. 154(b) by 110 days.

(21) Appl. No.: 10/603,408

(22) Filed: Jun. 23, 2003

(65) Prior Publication Data
US 2004/0260728 A1    Dec. 23, 2004

(51) Int. Cl.
G06F 17/30    (2006.01)

(52) U.S. Cl. ............... 707/101; 707/104.1; 705/30

(58) Field of Classification Search ........... 707/104.1, 707/200, 100, 102, 10, 101; 715/523; 719/314; 705/30
See application file for complete search history.

(56) References Cited

U.S. PATENT DOCUMENTS

| | | | |
|---|---|---|---|
| 4,831,580 A | 5/1989 | Yamada | |
| 5,187,787 A * | 2/1993 | Skeen et al. | 719/314 |
| 5,381,548 A | 1/1995 | Matsuo | |
| 5,390,330 A | 2/1995 | Talati | |
| 5,392,390 A * | 2/1995 | Crozier | 715/751 |
| 5,450,545 A | 9/1995 | Martin et al. | |
| 5,671,415 A | 9/1997 | Hossain | |
| 5,680,557 A | 10/1997 | Karamchetty | |
| 5,699,310 A | 12/1997 | Garloff et al. | |
| 5,708,828 A * | 1/1998 | Coleman | 715/523 |
| 5,802,514 A | 9/1998 | Huber | |
| 5,815,711 A | 9/1998 | Sakamoto et al. | |
| 5,818,445 A | 10/1998 | Sanderson et al. | |
| 5,859,637 A | 1/1999 | Tidwell, II | |
| 5,860,004 A | 1/1999 | Fowlow et al. | |
| 5,875,333 A | 2/1999 | Fish et al. | |
| 5,878,422 A * | 3/1999 | Roth et al. | 707/100 |
| 5,893,105 A | 4/1999 | MacLennan | |
| 5,920,718 A | 7/1999 | Uczekaj et al. | |
| 5,933,637 A | 8/1999 | Hurley et al. | |
| 5,950,001 A | 9/1999 | Hamilton et al. | |
| 6,016,394 A | 1/2000 | Walker | |
| 6,053,951 A | 4/2000 | McDonald et al. | |
| 6,083,277 A | 7/2000 | Fowlow et al. | |
| 6,173,269 B1 | 1/2001 | Solokl et al. | |

(Continued)

OTHER PUBLICATIONS

Free On-Line Dictionary of Computing definition of the term "wizard" <http://foldoc.doc.ia.ac.uk/foldoc/foldoc.cgi?wizard> printed Jun. 1, 2005, created (Sep. 7, 1998) 1 page.*

Primary Examiner—Paul L Rodriguez
Assistant Examiner—Luke Osborne
(74) Attorney, Agent, or Firm—Snell & Wilmer L. L. P.

(57) ABSTRACT

An interface file definition is used to translate data files in a particular format to another format. Data from a centralized source is translated into a format that set forth in an interface file definition. The interface file definition is created by entering the desired format of the information to be imported. Once all the information regarding the format is entered, the data is translated to the desired format. The desired format is typically a format that is easily used by another computer program to more easily process the desired information.

8 Claims, 3 Drawing Sheets

U.S. PATENT DOCUMENTS

| | | |
|---|---|---|
| 6,189,138 B1 | 2/2001 | Fowlow et al. |
| 6,243,858 B1 | 6/2001 | Mizoguchi et al. |
| 6,243,861 B1 | 6/2001 | Nitta et al. |
| 6,257,774 B1 | 7/2001 | Stack |
| 6,282,522 B1 | 8/2001 | Davis et al. |
| 6,286,017 B1 | 9/2001 | Egilsson |
| 6,289,513 B1 | 9/2001 | Bentwich |
| 6,324,681 B1 | 11/2001 | Sebesta et al. |
| 6,343,279 B1 | 1/2002 | Bissonette et al. |
| 6,438,742 B1 | 8/2002 | McCann et al. |
| 6,502,234 B1 | 12/2002 | Gauthier et al. |
| 2002/0019822 A1* | 2/2002 | Seki et al. .............. 707/10 |

* cited by examiner

METHOD AND SYSTEM FOR INTERFACING WITH ACCOUNTING SYSTEMS

FIELD OF INVENTION

This application generally relates to a method and system for managing the exchange of information, and more particularly, to a computer-implemented method and system for integrating data from a centralized source to individual entities.

BACKGROUND OF THE INVENTION

Corporations and other entities typically have employees who incur costs. These costs may be tracked and paid from a centralized system. For example, some employees may travel and incur hotel and airfare costs, wherein other employees may incur costs in supplying the company with various office supplies. These costs are often incurred in the form of a charge to a credit card or charge card. In some cases, the credit card charges incurred by the various employees are sent to the company on a periodic basis in the form of a statement which may be in a paper or electronic format. Corporations often desire to automatically import an electronic statement with a computerized accounting system.

With reference to FIG. 1, in the prior art, an organization, such as financial institution 102, generates electronic files on a periodic basis, wherein the files may include reports of charges incurred against various accounts. For example, a credit card company may generate a report every month detailing all of the transactions incurred by a certain credit card. A company 104 may have numerous employees, each with a credit card. Each credit card may have transactions that are reported on the electronic statement. Company 104 uses a computerized accounting system 106 to simplify the accounting process, wherein the accounting system may include any one of the many software accounting systems available, including those made by SAP, ORACLE, PEOPLESOFT, JD EDWARDS, LAWSON, WALKER, BAAN, GEAC, and many others. Because of the wide variety of accounting systems used by company 104, each using its own proprietary format, it is difficult for a financial institution to provide financial data to each company in an optimum format for the entity's accounting system. In the prior art, the data 108 from financial institution 102 was typically in a generic format that must be reformatted by each company 104 before being used by accounting system 106. Such a reformatting process typically includes a computer programmer developing a sophisticated computer program 110 to translate data from the format used by the financial institution to the format used by company 104. Such a software development process can be time consuming and expensive, including months of work and the attendant costs of paying for custom computer programming.

Such a process is cumbersome because, for example, a company may have multiple accounts from different financial institutions, each possibly using a different format for its statements. The company then needs to create a custom program to create an interface with each different financial institution. In addition, many companies have grown their businesses through the acquisition of other companies. In these instances, a company may have more than one accounting system, often from different software companies. The company then needs to create a more complex custom program to create multiple interfaces from a single financial institution to several accounting systems. As such, it would be desirable to have a system in which an entity can more easily import information from a third party such that the information can be more efficiently processed via computer.

SUMMARY OF THE INVENTION

A system is disclosed which solves the above-described problems. The system facilitates generating a file in a preferred format, such as a format used by a desired accounting software system. The method for facilitating the translation of files includes creating an interface file, reading data from a first source, reading the definitions contained in the interface file, and translating the data from the first source according to the definition contained in the interface file.

BRIEF DESCRIPTION OF THE DRAWINGS

A more complete understanding of the present invention may be derived by referring to the detailed description and claims when considered in connection with the Figures, where like reference numbers refer to similar elements throughout the Figures, and:

DETAILED DESCRIPTION

The present invention may be described herein in terms of various functional components and various processing steps. It should be appreciated that such functional components may be realized by a variety of different hardware or structural components configured to perform the specified functions. For purposes of illustration only, exemplary embodiments of the present invention will be described herein. Further, it should be noted that, while various components may be suitably coupled or connected to other components, such connections and couplings may be realized by a direct connection between components, or by a connection through other components and devices.

Figure 1:
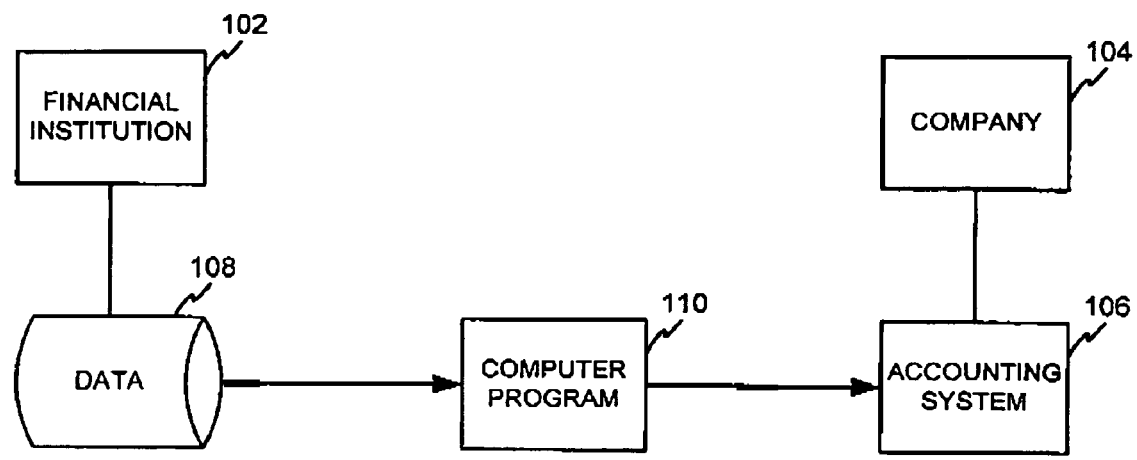
FIG. 1 presents a prior art system for importing data.
Figure 2:
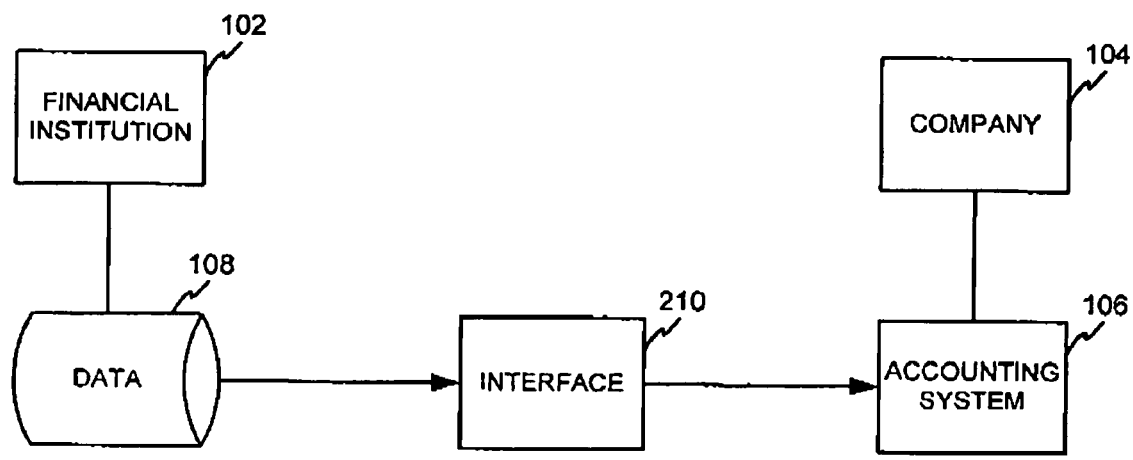
FIG. 2 presents an embodiment of the present invention.

In general, as shown in a block diagram of an embodiment of the present invention in FIG. 2, data 108 from financial institution 102 is provided to Interface File Builder 210. The data is converted by Interface File Builder 210 to a format usable by company 104.

Interface File Builder 210 is any hardware and/or software suitably configured to facilitate the modification of the format of data. In an exemplary embodiment, Interface File Builder 210 is a module in which a user can easily modify the format of the data from financial institution 102 into a format usable by accounting system 106. Once the data is in the desired format, company 104 is able to process the data in its preferred accounting program and is able to perform desired types of analyses.

The operation of Interface File Builder 210 will now be described in more detail. In one embodiment, interface file builder uses a "wizard" type of functionality in which a user is presented with a series of questions to answer about the desired interface file being built. After the wizard is completed, the interface file definitions are saved. The Interface File Builder 210 then uses these definitions to create, upon demand, an interface file for use by company 104. The interface file definitions are used to create a data file that may be in a variety of database or other electronic file formats, both proprietary and non-proprietary. A typical database will contain records, with each record containing data in a number of different fields. Each record may contain information regarding a particular financial transaction, separated into fields. Fields are used to separate the data into distinct portions. For example, one field may contain a date of a transaction, while another field may contain the amount of the transaction.

Figure 3:
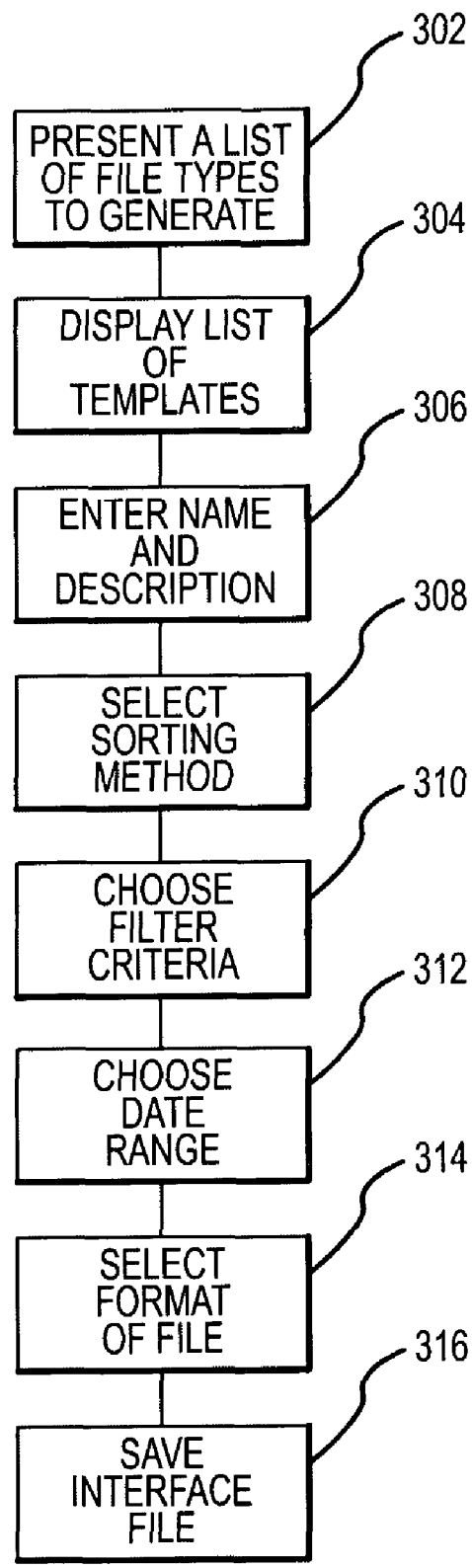
FIG. 3 is a flowchart illustrating the types of responses expected of a user of an embodiment of the present invention.

With reference to FIG. 3, a flowchart is presented illustrating the types of questions that a user may be asked in an embodiment of the present invention. A user is then presented with a list of types of files to generate (step 302). An exemplary list of types of files to be generated is presented in the following table:

| Corporate Purchasing Reconciliation | EXPENSE REPORTING |
|---|---|
| General Ledger ("G/L") | G/L |
| Accounts Payable ("A/P") | A/P (due payments only) |
|  | A/P (All charges) |
|  | Payroll |
| Cardmember List | Cardmember List |
| User List | User List |
| Data dump | Data Dump |

After selecting the type of file to be created, the user is presented with a list of templates (step 304). The templates present generic formats that serve as a starting point for creating a customized interface file. A template may present an interface file that works for many customers in that it presents the generally desired data. The user then starts to customize the interface file by, for example, entering in a name and description of the file being built (step 306). The user is also able to present a preferred sorting method (step 308). The user may wish to sort the data by date of transaction, or by name of card holder, by vendor, or by any number of different criteria. The user also may choose to filter the results (step 310). A filter is used to restrict the records being read. For example, a filter may be used to restrict the records being translated by the customized interface file such that only records from certain users are translated. The user is also able to choose a date range (step 312). By choosing a date range, the user is able to view transactions based on the date of the transaction. The user is also able to select a format of the file (step 314). Different accounting programs may require the files, or portions of files, to be in a specific format. Examples of available formats include, but are not limited to: comma-delimited; space-delimited; ASCII; ASN; XML; and a variety of proprietary formats. At any time during the creation of the interface file, the user is able to save the interface file for later completion (step 316).

Figure 4:
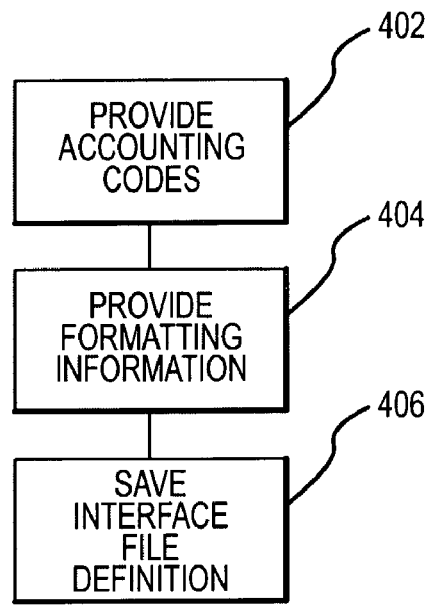
FIG. 4 is a flowchart illustrating the steps used in creating an interface file in the present invention.

Further details regarding the file format can be entered by the user. With reference to FIG. 4, an exemplary flowchart of the process is shown. The process shown in FIG. 4 allows a user to provide further detail of the desired format of the data. For example, accounting codes can be added to the data file to categorize the data (step 402). A user may also wish to specify the format of the various fields, such as the length, padding, type of field, and other characteristics (step 404). The user is also able to select a variety of properties to more particularly describe each field.

Exemplary properties may include the following:

Field Name—The short name of the field.

Description—A longer description of the field.

Status—A logical field used to flag accounting codes in templates specific to certain programs.

Length Flag—A logical field to indicate whether the field is fixed length or variable length.

Length—Length of the field (only for fixed length fields).

Minimum and Maximum Length—Minimum and maximum allowable lengths (only for variable length fields).

Format Mask—Forces the data into a particular format. For example, dates may be forced into the format MM/DD/YYYY.

Justification—the data in the field may be left-justified or right-justified.

Pad character—if a field needs padding (i.e., the field is required to be a certain length), the pad character is used to define the character used to fill up the field.

Quote—A logical field to indicate whether or not the value of the field should be enclosed in quotation marks.

Delimiter flag—A logical field that indicates if a field should be followed by a delimiter (delimited file types only).

Start position—Calculated to indicate the starting position of the field, with numbering starting at 1 rather than 0 (fixed width fields only).

End position—Calculated to indicate the ending position of the field, with numbering starting at 1 rather than 0 (fixed width fields only).

Counter Increment Flag—Flag used to indicate if counter fields are pre-incremented, post-incremented, or not incremented. Pre-increment indicates that the counter is increased before the field is processed, while post-increment indicates that the counter is increased after the field is processed.

Another property that is modifiable is an Element property. An Element is the information that will appear in the field. Various types of Elements may be supported by an embodiment of the present invention. Examples include the following:

Query Field—A data field from a table returned by the query being executed.

Static Table Entry—A static data field located in a data table.

Counter—A field which can also be stored in the new file table. This field can be set to increment or decrement by a specified value for each record in a table.

Fixed Text—A data field with a constant alphanumeric value.

Expression—Allows a user to create an expression that is evaluated at the time of the transfer of the record. An exemplary expression may be to add various values together to produce a value to be transferred. Many types of Expressions can be used here, from simple arithmetic to complex queries.

Character Function—Similar to fixed text, but allows the entry non-standard characters Common Expressions—An often used calculated expression, such as the current date or time.

In one embodiment, after completing the above information, the user may be able to save the interface file (also known as an Interface File Definition) (step 406). Once the Interface File Definition is saved, it may be selected by later users to interface with their particular accounting software.

The Interface File Definition is then used by Interface File Builder 210 to translate the file from the format used by financial institution 102 to a format useable by accounting system 106. Interface File Builder 210 processes each record from financial institution 102 and formats the record such that it is in the format prescribed by the Interface File Definition.

Figure 5:
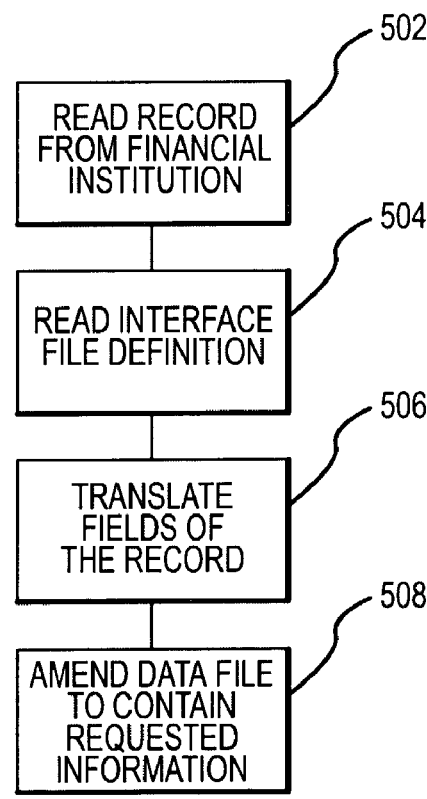
FIG. 5 is a flowchart illustrating the use of an embodiment of the present invention.

Interface File Builder 210 may be located in a variety of locations from which it can access the various files it needs to operate. The user will choose to run an interface file by selecting it from a list of "tasks" available to them. The specific file definition will have a name that the user gave it when defining the interface file. For example, the user might name a file and see it as "SAP G/L File—Memphis Manufacturing Plant". When the user selects a file type to run, the system will know where to go to get the definitions. In one embodiment, Interface File Builder 210 is located on a server that is maintained by financial institution 102. With reference to the flowchart in FIG. 5, an exemplary formatting process occurs in the following manner. A record from financial institution 102 is read by Interface File Builder 210 (step 502).

The Interface File Definition is then read by Interface File Builder 210 (step 504). The Interface File Definition may be stored in a variety of locations accessible by Interface File Builder 210. All or a portion of the fields of the record are then fully or partially translated such that the translation involves only a single translation step, following all or a portion of the directions in the Interface File Definition (step 506). For example, a date stored in an internal format can be converted, by one of a variety of methods, in the format described in the Interface File Builder (e.g., mm/dd/yyyy). Another example is that a text field will be made into the appropriate length and justification, as defined in the Interface File Definition. The Interface File Builder may also include other pieces of data not directly contained in the transaction data record from the financial institution. For instance, the user can specify fixed text fields, data counters, or data field stored in another database table to be included in the interface file. After each field (or a predefined number of fields) in the record is translated from the format used by financial institution 102 or derived from other available data sources, the resulting data file is amended to contain the requested information (step 508). The data fields are outputted to an electronic file in the order and with the correct format as specified in the interface file definitions. In other words, the formatted record, consisting of a number of formatted data fields, is appended to the end of the data file (interface file). The steps are then repeated for all (or a predefined number) of the records stored by financial institution 102. As noted above, the records being processed by Interface File Builder 210 can be limited in a variety of manners, such as limiting the date range or applying a filter.

Once all (or a predefined number) of the records are processed, the resulting data file is saved and can then be used by accounting system 106 to be processed in the normal course of business by company 104. Because the resulting data file is in a format that is readily processed by accounting system 106, accounting system 106 is thus more easily able to operate on the data. As such, the present invention facilitates creating an interface file in a short time frame, compared to the old method of creating a custom computer program to translate files to the correct format.

The present invention is described herein with reference to block diagrams, flowchart illustrations of methods, systems, and computer program products according to various aspects of the invention. It will be understood that each functional block of the block diagrams and the flowchart illustrations, and combinations of functional blocks in block diagrams and flowchart illustrations, respectively, may be implemented by computer program instructions. These computer program instructions may be loaded on a general purpose computer, special purpose computer, or other programmable data processing apparatus to produce a machine, such that the instructions which execute on the computer or other programmable data processing apparatus create means for implementing the functions specified in the flowchart block or blocks.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical electronic transaction system.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded on a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

The system may include a host server or other computing systems including a processor for processing digital data, a memory coupled to said processor for storing digital data, an input digitizer coupled to the processor for inputting digital data, an application program stored in said memory and accessible by said processor for directing processing of digital data by said processor, a display coupled to the processor and memory for displaying information derived from digital data processed by said processor and a plurality of databases, said databases including client data, merchant data, financial institution data and/or like data that could be used in association with the present invention. As those skilled in the art will appreciate, user computer will typically include an operating system (e.g., WINDOWS NT, 95/98/2000, LINUX, SOLARIS, etc.) as well as various conventional support software and drivers typically associated with computers. User computer can be in a home or business environment with access to a network. In an exemplary embodiment, access is through the Internet through a commercially-available web-browser software package.

As will be appreciated by one of ordinary skill in the art, the present invention may be embodied as a method, a data processing system, a device for data processing, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

In the foregoing specification, the invention has been described with reference to specific embodiments. However, it will be appreciated that various modifications and changes can be made without departing from the scope of the present invention. The specification and figures are to be regarded in an illustrative manner, rather than a restrictive one, and all such modifications are intended to be included within the scope of present invention.

Benefits, other advantages, and solutions to problems have been described above with regard to specific embodiments. No element described herein is required for the practice of the invention unless expressly described as "essential" or "critical."

I claim:

1. A computer-implemented method for facilitating the translation of financial transaction files comprising:

establishing, via said host computer, sorting criteria which include a date of a financial transaction, name of a financial account holder, and name of a merchant;

establishing, via said host computer, filter criteria which identify financial transaction records belonging to a client of a financial services company;

establishing, via said host computer, a date range which includes a start date and an end date for retrieving said financial transaction records;

establishing, via said host computer, a file format which includes at least one of: comma delimited, space delimited, ASCII, Abstract Syntax Notation (ASN), and eXtensible Markup Language (XML);

establishing, via said host computer, accounting codes which are used to categorize said financial transaction records in accordance with accounting systems owned by said client of said financial services company;

establishing, via said host computer, financial transaction field properties which include at least one of: field name, description, status, length flag, length, minimum length, maximum length, format mask, justification, pad character, quote, delimiter flag, start position, end position, and counter increment flag;

establishing, via said host computer, element properties which include at least one of: query field, static table entry, counter, fixed text, and character function;

establishing, via said host computer, an expression, wherein said expression is evaluated during said translation;

creating, via said host computer, an interface file including said sorting criteria, said filter criteria, said date range, said file format, said accounting codes, said field properties, said element properties, and said expression;

reading, via said host computer, unusable financial transaction data from a first source, wherein said first source is at said financial services company;

reading, via said host computer, said sorting criteria, said filter criteria, said date range, said file format, said accounting codes, said field properties, said element properties, and said expression contained in said interface file;

retrieving said unusable financial transaction data from said first source based on said sorting criteria, said filtering criteria, and said date range;

translating, via said host computer, using only a single translation of said unusable financial transaction data from said first source to create a first financial transaction data copy, wherein said first financial transaction data copy is in a format usable by a second source according to said file format, said accounting codes, said field properties, and said element properties contained in said interface file and, wherein said second source is associated with said client of said financial services company and, wherein said unusable financial transaction data from said first source is usable by said second source after said translating step;

executing, via a host computer, said expression, wherein said expression performs a calculation and retrieves a second financial transaction data copy from a third source;

formatting, via a host computer, said second financial transaction data copy in accordance with said file format, said accounting codes, said field properties, and said element properties;

combining said first financial transaction data copy and said second financial transaction data copy;

saving said combined data at said second source; and, saving, onto said host computer, said interface file.

2. The method of claim 1, wherein said receiving formatting information step comprises entering said formatting information for each field of said unusable data being translated.

3. The method of claim 2 wherein said formatting data comprises:

an indicator of fixed-width/variable width status;

a mask to force said unusable data into a particular style;

justification information; position information; and element information.

4. The method of claim 3, wherein said element information comprises: information regarding a type of said unusable data in said field, wherein said information comprises at least one of a calculated expression; a static table entry; alphanumeric information; and a query.

5. The method of claim 1 further comprising:

selecting a template file as a starting point for creating the interface file;

entering sorting information regarding a sorting preference; and entering filtering information regarding a filtering preference.

6. The method of claim 1, wherein said step of establishing definitions comprises establishing definitions based upon a response to a question presented to a user via a user interface.

7. The method of claim 1, wherein said translating step further comprises:

creating said second source of a predetermined type;

writing said unusable financial transaction data to said second source in said format usable by said second source; and, saving said second source.

8. The method of claim 1, wherein said step of creating, via said host computer, an interface file includes creating only one interface file.

* * * * *